Aug. 4, 1931.  L. TARTAGLIA  1,817,719
CAR TRUCK
Filed Sept. 13, 1930
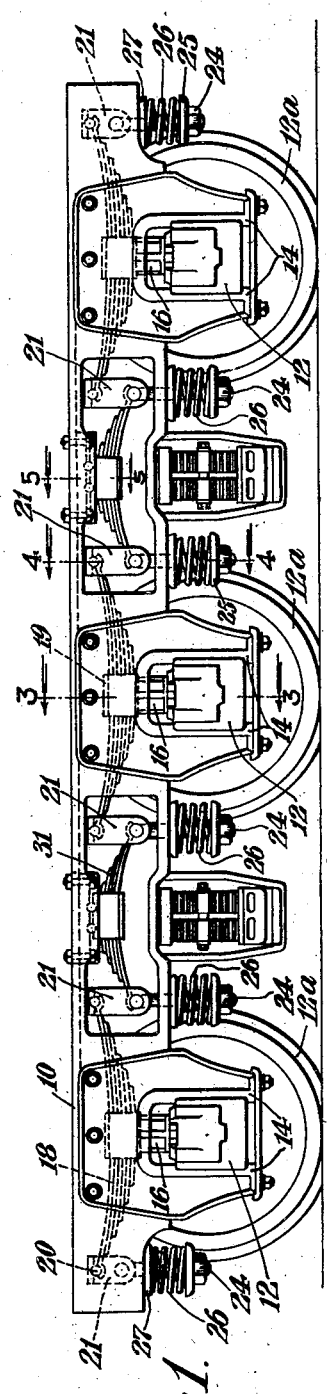
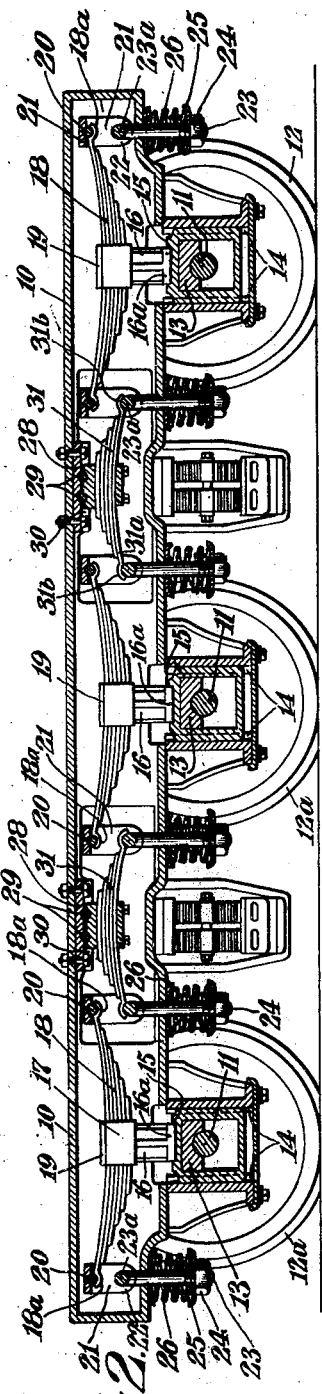
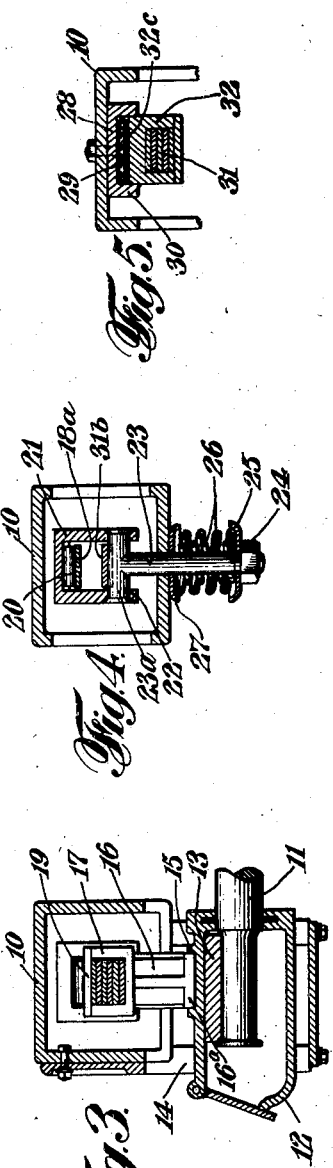
INVENTOR
Louis Tartaglia,
BY
Prindle Bean & Mann.
ATTORNEY Patented Aug. 4, 1931

1,817,719

UNITED STATES PATENT OFFICE

LOUIS TARTAGLIA, OF ALBANY, NEW YORK

CAR TRUCK

Application filed September 13, 1930. Serial No. 481,666.

The object of my invention has been to provide an improvement in railway car trucks which, while possessing all of the advantages of the present car trucks, shall enable the springs to be so adjusted that the pressure upon all the journal boxes, and particularly the middle journal boxes of a six wheel truck, shall be truly vertical, and consequently, that wear between the journal boxes and the guides on the truck frame upon which they are supported can be obviated, the liability to heating of the journal boxes producing what is known as "hot" boxes may be avoided, and the occasions when it is necessary to send the car to the shops for slow repairs may be reduced, and to such ends, my invention consists in the improvement in railway car trucks hereinafter specified.

In the accompanying drawings,

Fig. 1 is a side elevation of a six-wheel car truck, embodying my invention.

Fig. 2 is a longitudinal section of Fig. 1, and

Figs. 3, 4 and 5 are vertical cross-sectional views, taken respectively on lines 3—3, 4—4 and 5—5 of Fig. 1.

While the embodiment of my invention with which I have chosen to illustrate my invention, is the best embodiment known to me, it is to be understood that my invention is capable of embodiment in many different forms, and that it is not to be limited to the precise form shown herein.

In the form of my invention shown in the accompanying drawings, my invention is shown as applied to an ordinary six-wheel car truck, such as is commonly used on heavy passenger cars. The truck consists of a truck frame 10 which is provided with three axles 11, each having the usual pair of car wheels 12a. Each axle carries a pair of axle boxes 12, which are supported on the axles by means of a bearing block 13. The axle boxes are mounted between guides 14 formed on the truck frame. In the upper face of each axle box, is formed a circular seat 15, in which is mounted a "chair" or support 16. Each chair consists of a cylindrical foot 16a, which rests in the corresponding circular seat 15 and supports the parts which, in their turn, support the truck body 10.

Prior to my invention, the part supported by the chair and which carries the weight of the truck body and car body, has, on the two axles 11 at the ends of the truck, consisted of a spring 18; but the corresponding part on the middle axle has consisted of a rigid equalizer lever; and the connections have been such that if one of the springs became weakened, the equalizer lever would, through the connections between the said springs and said equalizer lever, be thrown out of balance so that the pressure on the bearing box would not be truly vertical, and the said middle axle box would be tipped in its guides on the truck frame, causing the guides and or the box to wear rapidly and requiring that they should be repaired, as by welding on material to replace the worn away metal, after which the restored parts have had to be machined again. This repair or replacement required the entire car to be sent to the shops, and thus causing a costly piece of equipment to remain idle for a substantial length of time.

By my invention, I am enabled to compensate the middle axle box for the said weakening of a spring, by a mere adjustment of the parts, which can be accomplished in a very short time and without sending the car to the shops. This, I have accomplished, not only by providing a combination of parts permitting such adjustment, but also, in said combination, by substituting a spring on said middle axle box for the said rigid equalizer lever. Said spring 18 for the middle axle box 12 is preferably made like the corresponding springs for the axle boxes at the ends of the truck.

Each of said springs is clamped in a socket 17 in its chair by a plate 19, which is secured to the socket by welding. The outer ends of the upper leaf of each spring 18, are provided with a depression 18a, or other form of seat or connection, for the purpose of supporting a roller, bolt, or other preferably round formation 20, carried by a yoke 21. Each yoke has depending ears 22 in which are mounted the ends of the cross-bar 23a of a T-bolt 23. The lower end of the T-bolt carries a nut 24, upon which is supported a washer 25, which supports a spring or nest of springs 26 upon which the truck frame rests, a washer 27 preferably being interposed between the truck frame and the springs.

In order to distribute any overload carried by any one axle, or any blow which it may receive from irregularities of the track to the other axles, connections are made between the neighboring yokes 21, or other parts, connected with the respective said springs 18. A plate 28 is secured as by bolts to the truck body, said plate having preferably rounded projections 29 on its under surface, maintained in vertical flanges 30 formed on the plate. A leaf spring 31, having its leaves held together by a clamp 32, has its lower leaf 31a formed with depressions 31b which are adapted to be seated upon the cross-arms 23a of the T-bolts 23 before mentioned. Seats 31c are formed in the clamp 32 to receive the rounded projections or bolts 29, thus supporting the truck frame on the equalizer springs 30. Sufficient space between the plate 28 and the clamp 32 is provided so that the spring 31 may rock on the bolts 29 and act as a lever in partially transmitting individual movement of one axle box to its neighbor, for distributing the spring action.

In the use of the illustrated embodiment of my invention, the tension of the arms of each axle-box spring 18, or equalizer spring 30, is adjusted by means of the nuts 24 on the T-bolts 23, so that the pressure on the seats of each axle box is truly vertical and uneven wear of the boxes or guides is avoided. When any spring of the series becomes weakened, the said weakness can be compensated for by tightening or loosening the nuts on the said T-bolts, thus increasing or decreasing the pressure created by the compression of the springs 26 which surround the said bolts. My invention thus provides an elastic and equalizing system by which compensation and good team work is obtained between the three pairs of wheels, and at the same time the weight of the car and truck frame are transmitted not only to the end axle boxes but to the middle axle-box so that said latter axle box, as well as the end axle boxes, is subjected only to balanced forces, tending only to move it vertically and thereby avoiding wearing or cutting either of the box or the guides. Although trucks of the general type which I have improved have been standard on great railroads for many years, yet the middle axle-box, in so far as I know, has always been liable to the faults which I have corrected. The frequency of the occurrence "hot boxes" is also reduced by my invention.

While the best results will be obtained by the use of a spring as the element 18, for supporting the load on the middle axle box, a substantial part of the advantage of my invention can be obtained by the use of an unyielding lever in the place of the said spring.

What I claim is:

1. In a car truck, the combination of a truck frame having axle boxes for three axles and having vertical guides in which said axle boxes are mounted, a spring being mounted upon each of the end axle boxes and connected with the truck frame, said middle axle box having a long horizontal member mounted thereon symmetrically over its axle and connected to the springs of said end axle boxes, and means for adjusting said horizontal member to control its horizontality.

2. In a car truck, the combination of a truck frame having axle boxes for three axles and having vertical guides in which said axle boxes are mounted, a spring being mounted upon each of the end axle boxes and connected with the truck frame, said middle axle box having a long horizontal member mounted thereon symmetrically over its axle and connected to the springs of said end axle boxes, said member having a part connected with each of its ends, each of said parts having a spring thereon, one end of said spring being in contact with the truck frame, and the other end being in contact with an adjustable shoulder on its part.

3. In a car truck, the combination of a truck frame having axle boxes for three axles and having vertical guides in which said axle boxes are mounted, a spring being mounted upon each of the end axle boxes and connected with the truck frame, said middle axle box having a long spring mounted thereon, symmetrically over its axle box, said last mentioned spring having a part connected with each of its ends, each of said parts having a spring thereon, one end of said spring being in contact with the truck frame and the other being in contact with an adjustable shoulder on its part and springs mounted on the frame and forming connections between the ends of the spring of said middle axle box with the adjacent ends of the springs of the end axle boxes.

4. In a car truck, the combination of a truck frame having axle boxes for three axles, and having vertical guides on which said axle boxes are mounted, a spring being mounted upon each of the end axle boxes and connected with the truck frame, said middle axle box having a long spring mounted thereon, symmetrically over its axle and connected to the springs of the said end axle boxes, said spring having a rod connected with each of its ends, each of said rods having a spring thereon, one end of which is in contact with the truck frame and the other end in contact with an adjustable shoulder on its rod and springs mounted on the frame and forming connections between the ends of the spring of said middle axle box with the adjacent ends of the springs of the end axle boxes.

5. In a car truck the combination of a truck frame having axle boxes for three axles and having vertical guides in which said axle boxes are mounted, a spring being mounted upon each axle box and connected with the truck frame, said springs being mounted symmetrically over their respective axles, each end of each of said springs having a rod connected thereto, and having a spring thereon, one end of each of said last mentioned springs, being in contact with the truck frame, and the other end being in contact with an adjustable shoulder on its part, and connections between the ends of the spring of said middle axle box with the adjacent ends of the springs of the end axle boxes.

6. In a car truck the combination of a truck frame having axle boxes for three axles and having vertical guides in which said axle boxes are mounted, a spring being mounted upon each axle box and connected with the truck frame, said springs being mounted symmetrically over their respective axles, each end of each of said springs having a rod connected thereto, each rod having a spring thereon, one end of each of said last mentioned springs being in contact with the truck frame and the other end being in contact with an adjustable shoulder on its part, and connections between the ends of the spring of said middle axle box with the adjacent ends of the springs of the end axle boxes, said connections being in the form of a lever.

7. In a car truck the combination of a truck frame having axle boxes for three axles and having vertical guides in which said axle boxes are mounted, a spring being mounted upon each axle box and connected with the truck frame, said springs being mounted symmetrically over their respective axles, each end of each of said springs having a rod connected thereto, each rod having a spring thereon, one end of each of said last mentioned springs being in contact with the truck frame, and the other end being in contact with an adjustable shoulder on its rod, and connection between the ends of the spring of said middle axle box with the adjacent ends of the springs of the end axle boxes, said connections being in the form of a spring lever.

8. In a car truck the combination of a truck frame having axle boxes for three axles and having vertical guides in which said axle boxes are mounted, each axle box having a horizontal leaf-spring mounted thereon symmetrically over the axle, each of which has a rod connected with each of its ends, said rods having springs thereon, one end of which is in contact with the frame and the other end with an adjustable shoulder on the rod, and a lever connecting each end of the spring of the middle axle box with the adjacent end of the spring of the adjacent end axle box.

9. In a car truck the combination of a truck frame having axle boxes for three axles and having vertical guides in which said axle boxes are mounted, each axle box having a horizontal leaf spring mounted thereon, symmetrically over its axle, each of which has a rod connected with each of its ends, said rods having springs thereon, one end of which is in contact with the frame and the other end with an adjustable shoulder on the rod, and a lever in the form of a leaf spring connecting each end of the spring of the middle axle box with the adjacent end of the spring of the adjacent end axle box.

In testimony that I claim the foregoing, I have hereunto set my hand this 30th day of August, 1930.

LOUIS TARTAGLIA.